United States Patent
Takahashi (10) Patent No.: US 12,469,602 B2
(45) Date of Patent: Nov. 11, 2025

(54) PROGNOSIS DETERMINATION DEVICE, PROGNOSIS DETERMINATION PROGRAM, AND PROGNOSIS DETERMINATION METHOD

(71) Applicant: DeepEyeVision Inc, Shimotsuke (JP)

(72) Inventor: Hidenori Takahashi, Shimotsuke (JP)

(73) Assignee: DeepEyeVision Inc., Shimotsuke (JP)

( * ) Notice: Subject to any disclaimer, the term of this patent is extended or adjusted under 35 U.S.C. 154(b) by 451 days.

(21) Appl. No.: 18/015,359

(22) PCT Filed: Jul. 15, 2021

(86) PCT No.: PCT/JP2021/026548
§ 371 (c)(1),
(2) Date: Jan. 10, 2023

(87) PCT Pub. No.: WO2022/014661
PCT Pub. Date: Jan. 20, 2022

(65) Prior Publication Data
US 2023/0317283 A1   Oct. 5, 2023

(30) Foreign Application Priority Data
Jul. 15, 2020 (JP) .................................. 2020-121098

(51) Int. Cl.
*G16H 50/20* (2018.01)
*G16H 50/50* (2018.01)

(52) U.S. Cl.
CPC ............. *G16H 50/20* (2018.01); *G16H 50/50* (2018.01)

(58) Field of Classification Search
CPC ......... G16H 50/20; G16H 50/50; G16H 50/70
See application file for complete search history.

(56) References Cited

U.S. PATENT DOCUMENTS

2010/0226550 A1   9/2010   Miyasa et al.
2018/0296320 A1   10/2018  Gupta et al.

FOREIGN PATENT DOCUMENTS

| JP | 2010-165127 A | 7/2010 |
| JP | 2020-058647 A | 4/2020 |
| WO | 2019/075410 A | 4/2019 |

OTHER PUBLICATIONS

"Predicting Visual Acuity by Using Machine Learning in Patients Treated for Neovascular Age-Related Macular Degeneration" by M. Rohm et al. Amer. Acad. Ophthal. 2018.*

(Continued)

*Primary Examiner* — Jason M Ip
(74) *Attorney, Agent, or Firm* — PROCOPIO, CORY, HARGREAVES & SAVITCH LLP (57) ABSTRACT

A prognosis determination device including an acquisition unit that acquires a medical image and a biological parameter that are related to a disease of a subject; and an output unit that inputs, to a discriminator, information on the medical image, information on the biological parameter, and information on treatment to be performed, and causes the discriminator to output information on a prognosis for a case where the treatment is performed, in which the discriminator has been generated through a machine learning process based on actual treatment data and interpolation treatment data, the actual treatment data is data on the treatment that has been actually performed, the actual treatment data including a pretreatment medical image as well as a pretreatment biological parameter of a patient, information on the treatment performed on the patient, and information on a prognosis for the patient after the treatment, and the interpolation treatment data is information for interpolating a posttreatment prognosis for the patient, the interpolation treatment data including information generated from the (Continued)

actual treatment data and a typical model obtained when the treatment is performed.

9 Claims, 6 Drawing Sheets

(56) References Cited

OTHER PUBLICATIONS

"Predicting optical coherence tomography-derived diabetic macular edema grades from fundus photographs using deep learning" by A.V. Varadarajan. Nat. Comm. 11:130, 2020.*

* cited by examiner

| SUBJECT ID | GENDER | AGE | DISEASE NAME | TREATMENT HISTORY | MEDICAL IMAGE | VISUAL ACUITY | BLOOD TEST | ... |
|---|---|---|---|---|---|---|---|---|
| 1000100 | ... | ... | ... | ... | ... | ... | ... | ... |
| 1000101 | ... | ... | ... | ... | ... | ... | ... | ... |
| ... | ... | ... | ... | ... | ... | ... | ... | ... |

PROGNOSIS DETERMINATION DEVICE, PROGNOSIS DETERMINATION PROGRAM, AND PROGNOSIS DETERMINATION METHOD

CROSS-REFERENCE TO RELATED APPLICATIONS

This application is US National Stage of International Patent Application PCT/JP2021/026548, filed Jul. 15, 2021, which claims benefit of priority from Japanese Patent Application JP2020-121098, filed Jul. 15, 2020, the contents of both of which are incorporated herein by reference.

TECHNICAL FIELD

The present invention relates to a prognosis determination device, a prognosis determination program, and a prognosis determination method.

BACKGROUND ART

In medical examination, medical images are regarded as important determination materials for diagnosing various diseases. For example, optical coherence tomography (OCT; hereinafter referred to as an OCT device), which can perform three-dimensional imaging as well as three-dimensional structural analysis and functional analysis of subject's eyes, is widely used in the ophthalmic diagnosis of retinas and the like. Meanwhile, catheter-type OCT devices are also used in the diagnosis of coronary arteries in the cardiovascular region.

A tomogram of the ocular fundus that is obtained by using an OCT device in the ophthalmic diagnosis of a retina includes information that is important for the diagnosis, such as information on a disease of a subject's eye and information on the visual acuity of the subject. However, since the diagnosis of the tomogram of the ocular fundus requires interpretation by a specialist, it would be difficult to perform correct diagnosis if there is no fully experienced specialist, which is problematic.

In response, analysis of medical images has become increasingly important in recent years. For example, there has been developed an image processing method for detecting an abnormality in the ocular fundus regarding the aforementioned example. More specifically, Patent Literature 1 discloses a method of determining if there is any abnormality in the ocular fundus by acquiring choroid information from an ocular fundus image of a subject's eye and comparing the acquired choroid information with a standard choroid database.

CITATION LIST

Patent Literature

Patent Literature 1: Japanese Patent Laid-Open No. 2020-058647

SUMMARY OF INVENTION

Technical Problem

Specialists are required to not only diagnose a disease of a subject from a medical image but also determine an appropriate treatment method for the subject in accordance with his/her disease state and further determine an expected prognosis for a case where the treatment is performed. Therefore, implementation of a mechanism is desired that can determine from a medical image a prognosis for a case where predetermined treatment is performed.

An object of the present invention, which has been made in view of the foregoing circumstances, is to provide a prognosis determination device, a prognosis determination program, and a prognosis determination method each capable of determining, based on a medical image, a prognosis for a case where predetermined treatment is performed.

Solution to Problem

A prognosis determination device according to an embodiment of the present invention includes an acquisition unit that acquires a medical image and a biological parameter that are related to a disease of a subject; and an output unit that inputs, to a discriminator, information on the medical image, information on the biological parameter, and information on treatment to be performed on the subject, and causes the discriminator to output information on a prognosis for the subject for a case where the treatment is performed, in which the discriminator has been generated through a machine learning process based on actual treatment data and interpolation treatment data, the actual treatment data is data on the treatment that has been actually performed, the actual treatment data including a pretreatment medical image as well as a pretreatment biological parameter of a patient, information on the treatment performed on the patient, and information on a prognosis for the patient after the treatment, and the interpolation treatment data is information for interpolating a posttreatment prognosis for the patient, the interpolation treatment data including information generated from the actual treatment data and a typical model obtained when the treatment is performed.

According to such a configuration, it is possible to determine, based on a medical image, a prognosis for a case where predetermined treatment is performed without depending on specialists. When there are a plurality of options of treatment methods, a prognosis can be determined for each treatment. Thus, it becomes possible to present reference information for a doctor or subject to select a treatment method. Further, since the aforementioned discriminator is obtained using the actual treatment data and the interpolation treatment data as training data, it is possible to prepare a sufficient amount of training data even when the amount of the actual treatment data is small. Thus, it is possible to further improve the accuracy of the determination of information on a prognosis to be output.

The output unit of the aforementioned prognosis determination device may further cause the discriminator to output information on a prognosis for a case where the treatment is not performed.

Accordingly, it is also possible to provide, as information to be compared with a case where the treatment is performed, information on a prognosis for a case where the treatment is not performed. Further, comparing the prognosis for the case where the treatment is performed with the prognosis for the case where the treatment is not performed can evaluate the effects of the treatment.

The aforementioned prognosis determination device may be configured such that at least one of information on past treatment performed on the subject, age of the subject, or gender of the subject is further input to the discriminator.

Accordingly, the discriminator can also take into consideration the past treatment history and the age and gender of the subject. Thus, the accuracy of the determination of information on a prognosis to be output from the prognosis determination device improves.

The aforementioned prognosis determination device may further include a display unit that displays the information on the prognosis for each treatment type, for each treatment cost, or for each prognosis in a controlled manner.

Accordingly, it is possible to display, for each treatment type, the treatment cost, or the prognosis for a case where the treatment is performed such that the displayed information can be compared with one another.

Further, the typical model obtained when the treatment is performed includes information on the treatment and information on a prognosis after the treatment, and is created from information not including the pretreatment medical image.

Such a typical model can be created based on information open to the public, such as a medical paper describing a treatment method and a prognosis therefor, or clinical trial data, for example.

The medical image may be an ocular fundus image, and the prognosis may be a visual acuity prognosis. Further, the ocular fundus image may be a tomogram in a horizontal direction and a tomogram in a vertical direction.

Accordingly, the prognosis determination device of the present embodiment functions as a device for determining a visual acuity prognosis. Further, using a tomogram in the horizontal direction and a tomogram in the vertical direction as an ocular fundus image tends to further improve the accuracy of the determination of a prognosis. Besides, the prognosis determination device of the present embodiment is not limited to those described above, and functions as a device for determining a prognosis for any disease by setting each of the type of a medical image and a target disease, for example.

Further, a prognosis determination program according to an embodiment of the present invention causes a prognosis determination device to execute: a step of acquiring a medical image and a biological parameter that are related to a disease of a subject; and a step of inputting, to a discriminator, information on the medical image, information on the biological parameter, and information on treatment to be performed on the subject, and causing the discriminator to output information on a prognosis for the subject for a case where the treatment is performed, in which the discriminator has been generated through a machine learning process based on actual treatment data and interpolation treatment data, the actual treatment data is data on actual treatment, the actual treatment data including a pretreatment medical image as well as a pretreatment biological parameter of a patient, information on the treatment performed on the patient, and information on a prognosis for the patient after the treatment, and the interpolation treatment data is information for interpolating a posttreatment prognosis for the patient, the interpolation treatment data including information generated from the actual treatment data and a typical model obtained when the treatment is performed.

A prognosis determination method according to an embodiment of the present invention causes a prognosis determination device to execute: a step of acquiring a medical image and a biological parameter that are related to a disease of a subject; and a step of inputting, to a discriminator, information on the medical image, information on the biological parameter, and information on treatment to be performed on the subject, and causing the discriminator to output information on a prognosis for the subject for a case where the treatment is performed, in which the discriminator has been generated through a machine learning process based on actual treatment data and interpolation treatment data, the actual treatment data is data on actual treatment, the actual treatment data including a pretreatment medical image as well as a pretreatment biological parameter of a patient, information on the treatment performed on the patient, and information on a prognosis for the patient after the treatment, and the interpolation treatment data is information for interpolating a posttreatment prognosis for the patient, the interpolation treatment data including information generated from the actual treatment data and a typical model obtained when the treatment is performed.

Advantageous Effects of Invention

The present invention can provide a prognosis determination device, a prognosis determination program, and a prognosis determination method each capable of determining, based on a medical image, a prognosis for a case where predetermined treatment is performed.

DESCRIPTION OF EMBODIMENTS

Although an embodiment of the present invention will be hereinafter described in detail with reference to the drawings, the present invention is not limited thereto and can be modified in various ways within the gist of the present invention.

<Hardware Configuration>

In an embodiment of the present invention, a prognosis determination system 1 that determines, based on a medical image, a prognosis for a case where predetermined treatment is performed is constructed with an information processing device 100 that is a prognosis determination device, for example.

Figure 1:
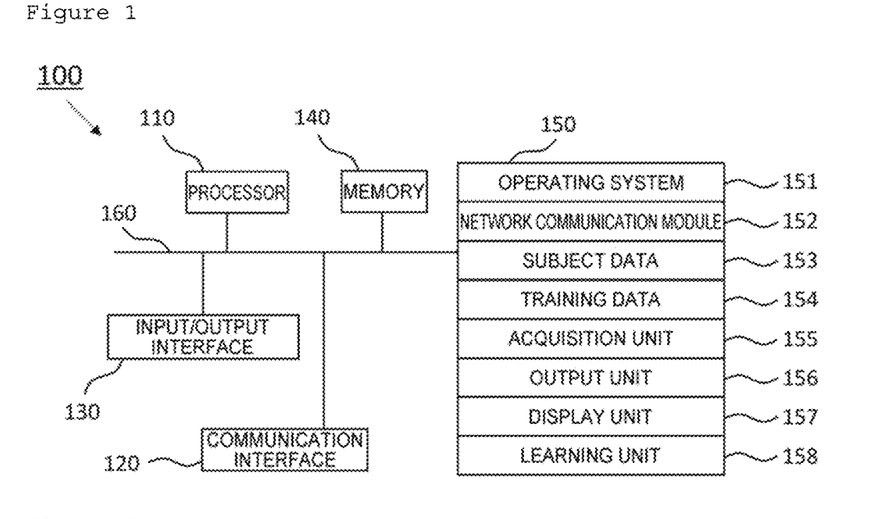
FIG. 1 is an exemplary block diagram illustrating the functional configuration of an information processing device according to an embodiment of the present invention.

FIG. 1 is a block diagram illustrating the information processing device 100 included in the prognosis determination system of an embodiment of the present invention. The information processing device 100 typically includes one or more processors 110, a communication interface 120 that controls wire communication or radio communication, an input/output interface 130, a memory 140, a storage 150, and one or more communication buses 160 for mutually connecting such components. A process, function, or method described in the present disclosure is implemented through cooperative operation of such components.

The processor 110 executes a process, function, or method implemented with a code included in a program stored in the memory 140 or with an instruction. Examples of the processor 110 include, but are not limited to, one or more central processing units (CPUs) and GPUs (Graphics Processing Units).

The communication interface 120 transmits various types of data to and receives various types of data from other information processing devices via networks. Such communication may be executed either by wire or by radio, and any communication protocol may be used as long as the mutual communication can be executed. For example, the communication interface 120 is implemented as hardware, such as a network adapter, various types of communication software, or a combination of both.

The input/output interface 130 includes an input device that inputs various operations for the information processing device 100, and an output device that outputs the results of processes performed by the information processing device 100. For example, the input/output interface 130 includes an information input device, such as a keyboard, mouse, and touch panel; an image input device, such as an OCT device or an ocular fundus camera; and an image output device, such as a display. The information processing device 100 may receive a predetermined input by having the external input/output interface 130 connected thereto. For example, the information processing device 100 may have connected thereto an external image input device, such as an OCT device or an ocular fundus camera.

The image input device can be appropriately selected according to a medical image to be acquired. Examples of the medical image in the present embodiment include, but are not limited to, images obtained with X rays, CT, MRI, nuclear medicine (PET or SPECT), ultrasound, and an endoscope. The medical image may be a still image or a dynamic image (i.e., a moving image). The medical image may also be image information in a universal format, such as JPEG, or image information in a medical format compliant with the international standards, such as DICOM (Digital Imaging and Communication in Medicine). Such a medical image compliant with a medical format may be accompanied with tag information, such as conditions and date and time of tests such as CT, and the age and gender of a patient determined by other standards, for example.

The memory 140 temporarily stores a program loaded from the storage 150, and provides a work area to the processor 110. The memory 140 also temporarily stores various types of data generated while the processor 110 is executing a program. Examples of the memory 140 include, but are not limited to, DRAM, SRAM, DDR RAM, and other high-speed random access memories, such as a random access solid-state memory, and further, a combination of them.

The storage 150 stores programs, various functional units, and various types of data. Examples of the storage 150 include, but are not limited to, a magnetic disk storage device, an optical disc storage device, a flash memory device, and other nonvolatile memories, such as a nonvolatile solid-state memory, and further, a combination of them. Other examples of the storage 150 include one or more storage devices disposed remote from the processor 110.

In an embodiment of the present invention, the storage 150 stores programs, functional units, and data structures; or a subset of them. The information processing device 100 is configured to function as an acquisition unit 155, an output unit 156, a display unit 157, and a learning unit 158 as illustrated in FIG. 1 as the processor 110 executes an instruction included in a program stored in the storage 150.

The operating system 151 includes procedures for processing various basic system services and executing tasks using hardware, for example.

The network communication unit 152 is used to connect the information processing device 100 to other computers via the communication interface 120 and via one or more communication networks, such as the Internet, other wide area networks, a local area network, and a metropolitan area network, for example.

Figure 2:
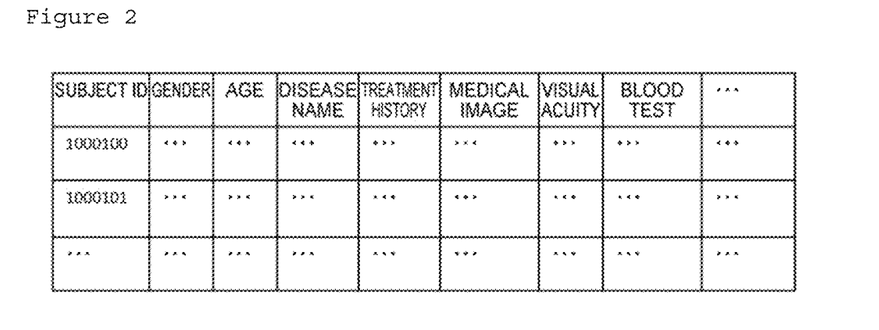
FIG. 2 is a chart illustrating an example of subject data 153.

As subject data 153, personal information on a subject for whom a prognosis is to be determined is recorded. For example, a medical image or a biological parameter to be input to a discriminator may be recorded. For example, as illustrated in FIG. 2, the subject data 153 may include information on a subject, such as gender, age, disease name, treatment history, medical image, visual acuity, and blood test. Further, the information on the medical image, visual acuity, and blood test may include not only the current information but also the past information. The subject data 153 may be an electronic health record stored in the storage 150, or an electronic health record stored in a remote server.

In the present embodiment, the "biological parameter" means information on a subject other than a medical image. Examples of the biological parameter include information, such as gender, age, height, weight, visual acuity, hearing, blood pressure, blood test result, urine test result, electrocardiogram test result, diagnosis made at the time of input, disease stage, past medical history, and treatment history. Further, the biological parameter may include a value that serves as an index for the determination of a prognosis, such as visual acuity for an eye disease, for example. It should be noted that the following description includes a case of an eye disease as an example, and visual acuity is used as an example of a value that serves as an index for the determination of a prognosis unless otherwise stated.

In the present embodiment, a "subject" means a person for whom a prognosis is determined with the prognosis determination device of the present embodiment. Meanwhile, a "patient" means a person from whom actual treatment data and the like to be stored as training data described below is obtained.

Training data 154 is a data set used to generate a discriminator. The training data 154 includes actual treatment data acquired through the actual treatment, and further includes interpolation treatment data generated from the actual treatment data.

For example, the training data 154 includes information on a pretreatment medical image, information on the treatment, and information on a prognosis after the treatment. The training data 154 may be stored in the storage 150 or in a remote server.

The training data 154 includes actual treatment data acquired through the actual treatment, and further includes interpolation treatment data generated from the actual treatment data.

The actual treatment data included in the training data 154 is data on the actual treatment, and includes information on a medical image as well as a biological parameter before the actual treatment is performed, information on the treatment performed on a patient, and information on a prognosis for the patient after the treatment. The information on the posttreatment prognosis for the patient may include information on a medical image as well as a biological parameter of the patient. Such actual treatment data can be collected from a doctor, a nurse, other medical service workers, or a medical institution. It is often the case that such actual treatment data collected from a medical institution is acquired not by regularly recording prognoses for the treatment but by recording prognoses for the treatment intermittently at the timing when the patient visits the medical institution as illustrated in FIG. 3.

Figure 3:
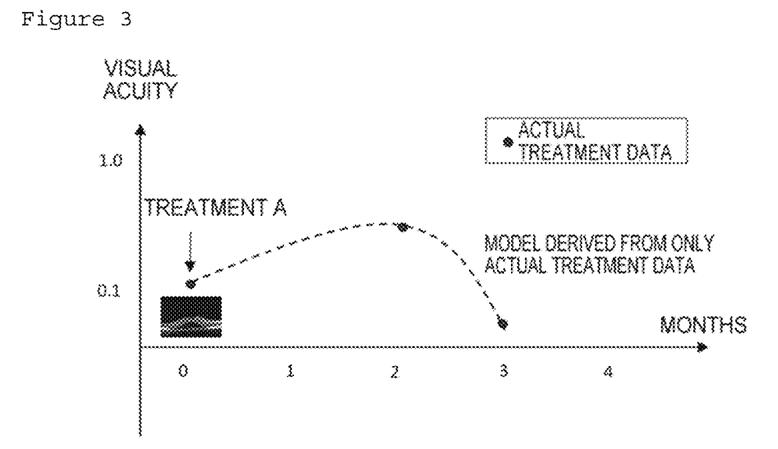
FIG. 3 is a chart for illustrating an example of actual treatment data.

When one attempts to create a prognosis prediction model based only on such actual treatment data, a model indicated by the dashed line in FIG. 3 is obtained.

However, since the thus obtained model is based on pieces of data on the progress after the treatment that have been acquired with low frequency, there is no positive proof that such a model shows a correct prognosis. Even if it is possible to collect a substantial number of pieces of such actual treatment data from a plurality of patients, the individual pieces of such actual treatment data are insufficient to create a correct model. Thus, it would be difficult to create a model that can determine a prognosis with high accuracy.

Further, in practice, even a single disease requires a variety of types of treatment to be performed on individual patients. Thus, it would be difficult to collect a substantial number of pieces of actual treatment data on patients who have the same disease and have been subjected to the same treatment. Meanwhile, to further improve the prediction accuracy of a prognosis, it may be considered effective to collect pieces of actual treatment data on a group of patients with about the same age and gender, for example. However, it would be even more difficult to collect a substantial number of pieces of such actual treatment data.

In contrast, in the present embodiment, interpolation treatment data for supplementing the actual treatment data is created, and such interpolation treatment data is used as part of the training data. The interpolation treatment data is information for interpolating a posttreatment prognosis for a patient, and includes information generated from the actual treatment data and a typical model obtained when the treatment is performed. Such interpolation treatment data is obtained by, provided that a given treatment method has been performed on an individual having information on a given medical image, for example, supplementing the actual treatment data with information on a prognosis predicted from the typical model.

The typical model may include information on treatment and information on a prognosis after the treatment, for example. The typical model may be created from information not including a pretreatment medical image, or may be created from information including a pretreatment medical image. Similarly, the typical model may or may not take into consideration a pretreatment medical image as a model that shows a prognosis for given treatment.

Figure 4:
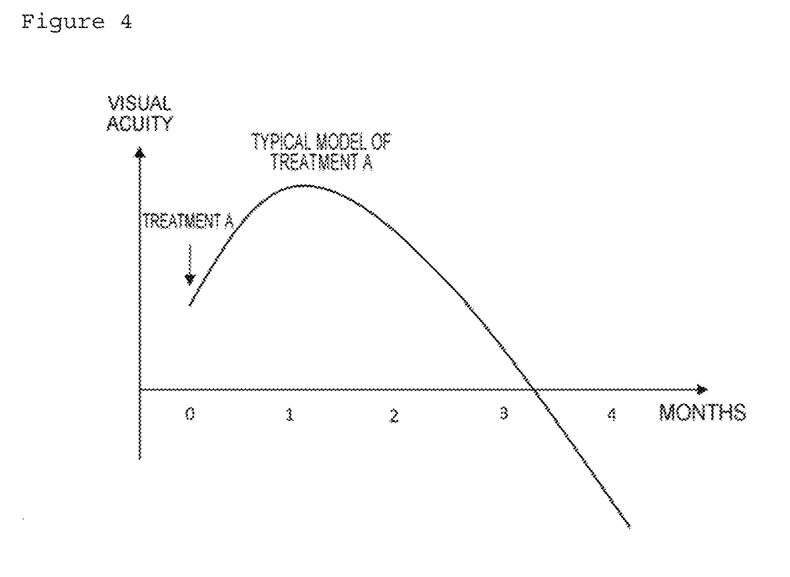
FIG. 4 is a chart for illustrating an example of a typical model.

FIG. 4 illustrates an image of a typical model. In FIG. 4, a typical model is illustrated that has been created by recording a visual acuity prognosis for a patient subjected to given treatment every other day and that includes the progress thereof. Such a typical model can be created based on information open to the public, such as a medical paper describing a treatment method and a prognosis therefor, or clinical trial data, for example.

Such a medical paper related to a treatment method or information on clinical trials, which serves as a basis for creating the typical model, includes information on a prognosis for a case where the treatment method is performed, in particular, medical effects of the treatment method, and thus shows the medical effects. For this reason, such a medical paper or information on clinical trials includes information on a prognosis recorded at shorter intervals than the actual treatment data that is routinely acquired in a medical institution. Therefore, in comparison with the prognosis prediction model that includes only the actual treatment data (see the dashed line in FIG. 3), the typical model (see the solid line in FIG. 4) shows a correct prognosis.

Regarding the actual treatment data, there may be a case where the initial treatment is followed by the next treatment in two months, for example. In such a case, there may be no data on a prognosis when three months have elapsed from the initial treatment without the next treatment performed, or a prognosis when four months have elapsed from the initial treatment without the next treatment performed (see the dashed line in FIG. 3). In contrast, the typical model can represent a prognosis for a longer span (see the solid line in FIG. 4).

Figure 5:
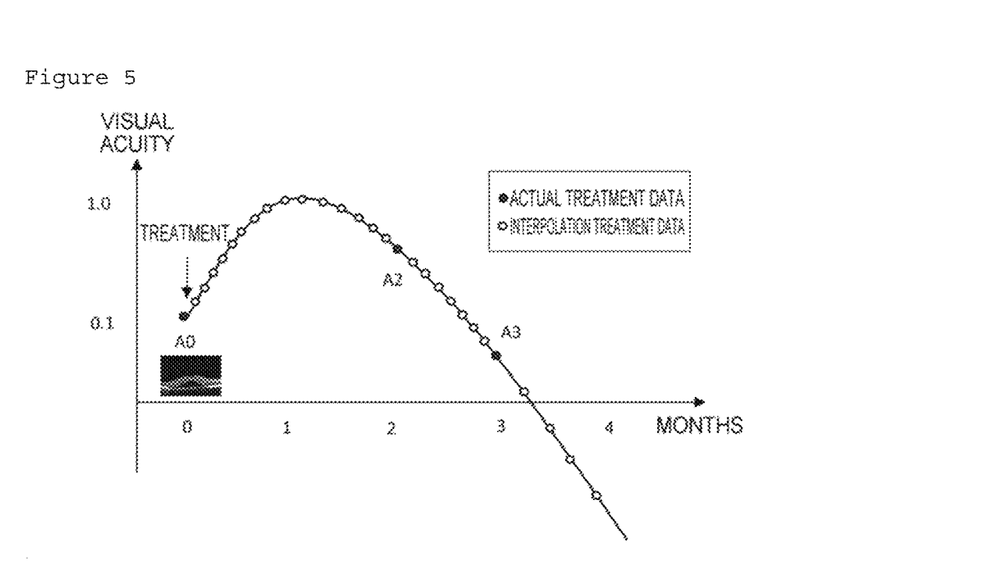
FIG. 5 is a chart for illustrating an example of interpolation treatment data.

The aforementioned typical model is applied to pieces of actual treatment data so as to interpolate a prognosis for portions between the pieces of actual treatment data, thereby creating interpolation treatment data. FIG. 5 illustrates an image of the interpolation treatment data. In FIG. 5, a portion between the actual treatment data A0 obtained immediately before treatment is performed (0 month) and the actual treatment data A2 obtained after two months have elapsed from the treatment, a portion between the actual treatment data A2 obtained after two months have elapsed and the actual treatment data A3 obtained after three months have elapsed from the treatment, and a portion of from the actual treatment data A3 obtained after three months have elapsed from the treatment are interpolated with data. A method for creating such interpolation treatment data is not limited to a particular method, but it is possible to interpolate or extrapolate the actual treatment data with information on a prognosis after the treatment, for example.

When the interpolation treatment data is generated by applying the aforementioned typical model to the actual treatment data as described above, it is possible to supplement missing parts of the actual treatment data with the interpolation treatment data even if there is a circumstance where the actual treatment data is not the one obtained by regularly recording a prognosis for the treatment, for example. Therefore, a discriminator, which is generated through a machine learning process based on the actual treatment data and the interpolation treatment data, can show a more correct prognosis.

The interpolation treatment data need not be the one obtained by interpolating every missing part of the actual treatment data as long as the interpolation treatment data is the one obtained by interpolating the actual treatment data with a value that serves as an index for the determination of a prognosis. For example, in FIG. 5, the actual treatment data includes, in addition to visual acuity that serves as an index for the determination of a prognosis, a pretreatment medical image of the patient and information on a biochemical parameter other than visual acuity, for example. However, the interpolation treatment data need not include a medical image or information on a biochemical parameter other than visual acuity as long as it includes information on the days that have elapsed from the day of the treatment as well as information on visual acuity.

Regarding the actual treatment data also, not all pieces of the actual treatment data A0, A2, and A3 in FIG. 5 need to include a medical image and a biochemical parameter other than visual acuity, for example. For example, only the actual treatment data A0 may include a medical image and a biochemical parameter other than visual acuity, while the actual treatment data A2 and A3 may include only information on visual acuity that serves as an index for the determination of a prognosis.

In particular, the actual treatment data preferably includes at least a medical image of a test result obtained immediately before the treatment is performed (i.e., the actual treatment data A0). Training data created in such a case includes, as the actual treatment data, the medical image of the test result obtained immediately before the treatment is performed, information on the treatment performed, and information on a prognosis for the patient after the treatment, and includes, as the interpolation treatment data, information on a prognosis used to interpolate the actual treatment data. That is, the training data is data indicating, if given treatment is performed on an individual in a state of a predetermined medical image, how a prognosis will transition.

A discriminator, which is generated through a machine learning process using a substantial number of pieces of such training data prepared, will output information on a prognosis after the treatment based on information on the medical image, information on the biochemical parameter, and information on the treatment to be performed.

The acquisition unit 155 executes a process of acquiring from the communication interface 120 or the input/output interface 130 information on a medical image of a subject, information on a biological parameter of the subject, and information on the treatment to be performed on the subject. Each piece of information acquired by the acquisition unit 155 can be stored as the subject data 153. Hereinafter, the acquisition unit 155 will be described with reference to an eye disease as an example, but the present embodiment is not limited to eye diseases.

Examples of a medical image for an eye disease acquired by the acquisition unit 155 include an ocular fundus image. Examples of information on the ocular fundus image include, but are not limited to, a tomogram of the ocular fundus acquired with an OCT device, and an ocular fundus photograph obtained with an ocular fundus camera for example. Further, the ocular fundus image may be a tomogram in the horizontal direction and a tomogram in the vertical direction.

Information on a biological parameter for an eye disease acquired by the acquisition unit 155 may include information on visual acuity that serves as an index for the determination of a prognosis. Examples of the information on visual acuity include the value of visual acuity obtained through a visual acuity test based on a Landolt ring, E chart, Snellen chart, or the like, or obtained with a visual acuity testing device. Further, examples of the information on visual acuity may include the results of a known test related to one's vision performed with an Amsler grid.

Further, information on the treatment to be performed acquired by the acquisition unit 155 is information on the treatment to be performed for a disease related to the subject's eye. For example, for a subject with age-related macular degeneration, treatment methods, such as anti-vascular endothelial growth factor therapy (anti-VEGF therapy), photodynamic therapy, and laser photocoagulation, are known. Further, as the types of intravitreal injection of anti-VEGF drug for the anti-VEGF therapy, Lucentis (ranibizumab), Macugen (pegaptanib), and Eylea (aflibercept) are known, for example. The frequency and the number of times of injection vary depending on the disease state. For example, in the anti-VEGF therapy, anti-VEGF drug is directly injected into the eye every four weeks or every six weeks. There may also be a case where the anti-VEGF therapy is combined with the photodynamic therapy, for example.

The information on the treatment to be performed is the foregoing information on treatment methods. For example, such information may include a plurality of treatment patterns that can be applied to a disease related to the subject's eye, such as a case where the anti-VEGF therapy is performed once in four weeks, a case where the anti-VEGF therapy is performed once in six weeks, and a case where the anti-VEGF therapy to be performed once in four weeks is combined with the photodynamic therapy.

Further, the information on the treatment to be performed may include a disease name instead of or in addition to the aforementioned specific treatment method. For example, when the information on the treatment to be performed includes a disease name "age-related macular degeneration," it can be regarded that known treatment methods for the age-related macular degeneration have been designated. Accordingly, information on a prognosis after the treatment can be output for each of a plurality of treatment methods for age-related macular degeneration.

Furthermore, the information on the treatment to be performed may include doctor's findings that are necessary for diagnosing a disease name instead of or in addition to the disease name. For example, when the information on the treatment to be performed includes a finding that "only the central part of the field of vision appears distorted (metamorphopsia)" or a finding that "the central part appears dark (paracentral scotoma)," it can be regarded that treatment methods for the disease related to the finding have been designated. Accordingly, information on a prognosis after the treatment can be output for each of a plurality of treatment methods that are effective for the finding.

Although age-related macular degeneration has been described as an example above, the target disease is not limited thereto and may be epiretinal membrane, macular holes, macular edema, glaucoma, cataract, or other eye diseases in general.

Further, the information on the treatment to be performed may have associated therewith information on the cost related to the treatment. Examples of the information on the cost related to the treatment include a medical score for each treatment and the medical cost for a case where a subject's burden (as opposed to the coverage provided by the national insurance) is 10%, 30%, or 100%.

The storage 150 may have data including treatment and information on the cost associated with the treatment. In such a case, even when the information on the treatment to be performed does not include information on the cost of the treatment, the acquisition unit 155 can, upon acquiring the information on the treatment to be performed, refer to the aforementioned database to associate the information on the cost with the information on the treatment to be performed.

The acquisition unit 155 may also be configured to acquire at least one of information on the treatment performed on the subject in the past, the age of the subject, or the gender of the subject. Such pieces of personal information can be used as elements for increasing the accuracy of information on a prognosis after the treatment to be output from a discriminator described below.

Each of the aforementioned pieces of information acquired by the acquisition unit 155 can be input to the information processing device 100 by a doctor, a nurse, other medical service workers, or a medical institution via the communication interface 120. Alternatively, each of the aforementioned pieces of information acquired by the acquisition unit 155 may be received by the acquisition unit 155 from other terminals or servers via the input/output interface 130.

The output unit 156 executes a process of inputting to the discriminator the information on the medical image, the information on the biological parameter, and the information on the treatment to be performed, and then outputting information on a prognosis for a case where the treatment is performed. The discriminator is not limited to a particular discriminator, but may be a learned model generated through a machine learning process based on the aforementioned training data, for example.

The output unit 156 may be further configured to input, to the discriminator, at least one of the information on the treatment performed on the subject in the past, the age of the subject, or the gender of the subject in addition to the aforementioned information. Since a prognosis can also be influenced by a treatment history, age, or gender, it is possible to, by adding such pieces of information to the information to be input to the discriminator, further improve the accuracy of information on a prognosis for a case where the treatment is performed.

Examples of the information on the prognosis for a case where the treatment is performed include information on a future change in a value that serves as an index for the determination of the prognosis, and information on the future progress of the disease. Further, the information on the prognosis may include, when there are a plurality of treatment patterns, information on a prognosis associated with each treatment pattern, for example. Accordingly, it is possible to make a comparison regarding how the prognosis will change depending on each treatment pattern. It is also possible to make a comparison regarding the cost associated with each treatment pattern.

Further, the output unit 156 may be further configured to cause the discriminator to output information on a prognosis for a case where the treatment is not performed. Accordingly, it is possible to acquire information on a prognosis for a case where the treatment is not performed. Therefore, it is possible to make a comparison regarding how the prognosis will change between the case where the treatment is not performed and the case where the treatment is performed.

With the aforementioned configuration, a prognosis for a case where predetermined treatment is performed can be determined based on a medical image without depending on specialists.

The information processing device 100 may include the display unit 157 that executes a process of displaying on a display device information on a prognosis output from the discriminator in a controlled manner. For example, the display unit 157 can display information on a prognosis for each treatment type, for each treatment cost, or for each prognosis in a controlled manner.

Regarding an eye disease, for example, the display unit 157 can perform control such that the predicted visual acuity of a subject in one week, in two weeks, and in three weeks after a treatment method A, a treatment method B, or a treatment method C . . . has been performed is plotted and displayed for each treatment method on an image output device, such as a display, such that the ordinate axis indicates the visual acuity and the abscissa axis indicates the time axis. The display unit 157 can also perform control such that treatment methods are displayed in a list form on a display or the like in order of decreasing or increasing cost, or displayed in a list form in order of worse or better prognosis level in one month.

Accordingly, it is possible to make a comparison regarding how the prognosis will change for each treatment type, or make a comparison regarding the treatment cost for each treatment type. The results of such a comparison can be used as reference materials for a doctor to explain his/her medical service policy to a subject, or as reference materials for the subject to select a treatment policy.

The information processing device 100 may also include the learning unit 158 that executes a process of generating a discriminator through a machine learning process based on the training data. Examples of the machine learning process include supervised learning and semi-supervised learning.

As described above, the training data 154 includes information on a pretreatment medical image, information on the treatment, and information on a prognosis after the treatment, for example. The training data also includes actual treatment data acquired in the actual treatment, and interpolation treatment data generated from the actual treatment data.

As described above, as the training data further includes the interpolation treatment data, it is possible to suppose a case where each of the treatment method A, the treatment method B, and the treatment method C . . . is performed on information on a medical image before one actual treatment is performed, and thus obtain information on a plurality of posttreatment prognoses. Therefore, training data can be collected efficiently, which can further improve the accuracy of a discriminator obtained with the training data.

The learning unit 158 may further execute a process of creating the interpolation treatment data from the actual treatment data. For creating the interpolation treatment data, for example, the learning unit 158 creates, based on information on medical effects of a treatment method included in a medical paper or the like, a typical model for predicting a prognosis for a case where the treatment method is performed. Then, the learning unit 158 applies the typical model to pieces of actual treatment data so as to interpolate a prognosis for portions between the pieces of actual treatment data, thereby creating the interpolation treatment data.

When the interpolation treatment data is created by interpolating or extrapolating the actual treatment data with information on a prognosis after the treatment, it is also possible to use the aforementioned typical model for predicting a prognosis to perform the interpolation or extrapolation.

Creating the interpolation treatment data in this manner can increase the number of cases included in the training data. Performing a machine learning process using the training data, which includes the actual treatment data and such interpolation treatment data, can further improve the accuracy of information on a prognosis to be output from the generated discriminator.

<Operation Process>

Next, the operation of the information processing device 100 of the embodiment of the present invention configured as above will be described.

(Creation of Discriminator)

Figure 6:
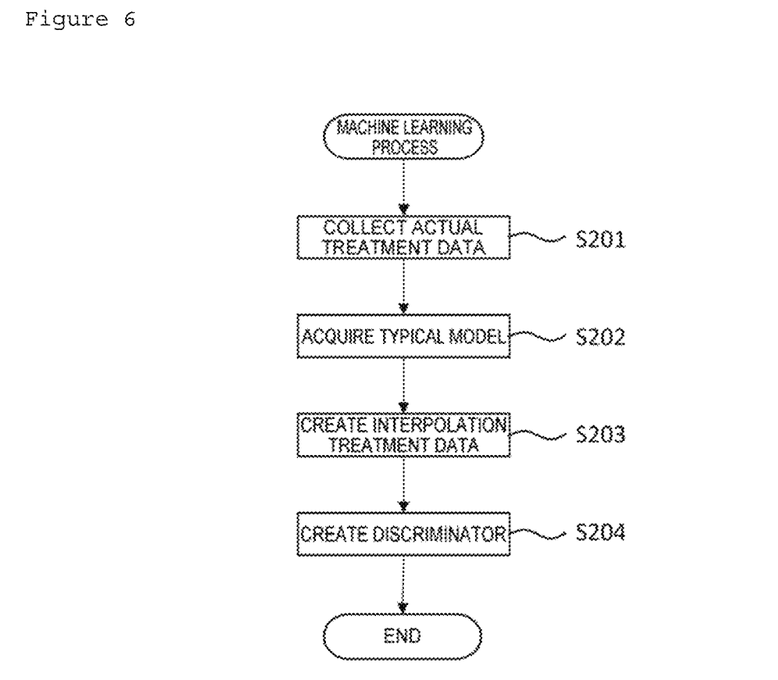
FIG. 6 is an exemplary flowchart illustrating an example of a machine learning process performed by a learning unit.

FIG. 6 is a flowchart illustrating an example of a machine learning process in which the learning unit 158 of the information processing device 100 creates a discriminator using training data.

In step S201, the learning unit 158 collects actual treatment data as the training data. At this time, the learning unit 158 can collect actual treatment data from the subject data 153 in the information processing device 100 or from subject data stored in another information processing device or server connected thereto via a network.

In step S202, the learning unit 158 acquires a typical model for predicting a prognosis for a case where a predetermined treatment method is performed. The learning unit 158 may acquire a typical model created by a doctor, other medical service workers, or a medical institution, or acquire a typical model stored in another information processing device or server connected thereto via a network. The learning unit 158 may also create a typical model through a machine learning process based on information on medical effects of a treatment method included in a medical paper or the like, and acquire such a typical model.

Regarding the typical model, since it is intended to allow an overall tendency to be learned as a model in advance, it is acceptable to, if there is no report of cases with the totally identical condition, select a prognosis from the closest document or report, and use the selected prognosis. It is also acceptable to, if there is a report of clinical research or a report of post-marketing surveillance, use the mean value thereof, and it is also acceptable to, if there is no data on the same race as the subject to be learned, use data on other races. Further, it is also possible to use a case report if the disease to be treated is rare and thus has not been subjected to clinical research so far.

A visual acuity prognosis, for example, is considered based on the log MAR visual acuity. Thus, if other visual acuity indices, such as ETDRS and decimal visual acuity, are handled, such indices may be used through conversion. Commonly reported prognoses are determined at long intervals, such as every other month. Thus, it is basically possible to perform linear interpolation, but if it is speculated from other documents or findings of specialists that the progress of the prognosis is not linear such that the disease becomes better once and then becomes worse again, it is possible to follow such a change. Regarding the extrapolation of prognosis data corresponding to a period in which there is no report, the extrapolation is also basically performed by linearly extending the data, but if most of the reports are the ones such that the next drug administration had been performed before the effects of the drug ceased, for example, it is possible to apply data on a natural prognosis to the extended part of the prognosis without additional administration. Further, if there is a related disease, it is also possible to use data on a prognosis for such a disease.

In step S203, the learning unit 158 creates the interpolation treatment data based on the actual treatment data and the typical model. For example, the learning unit 158 inputs into the typical model information on a medical image of the actual treatment data before the actual treatment is performed, and thus obtains information on the supposed treatment and information on the supposed posttreatment prognosis. Accordingly, the learning unit 158 can obtain the interpolation treatment data including the information on the medical image of the actual treatment data before the actual treatment is performed, the information on the supposed treatment, and the information on the supposed posttreatment prognosis.

In step S204, the learning unit 158 creates a discriminator from training data including the actual treatment data and the interpolation treatment data. For example, the learning unit 158 performs machine learning using the training data and using the information on the posttreatment prognosis as a ground-truth label.

(Estimation of Prognosis)

Figure 7:
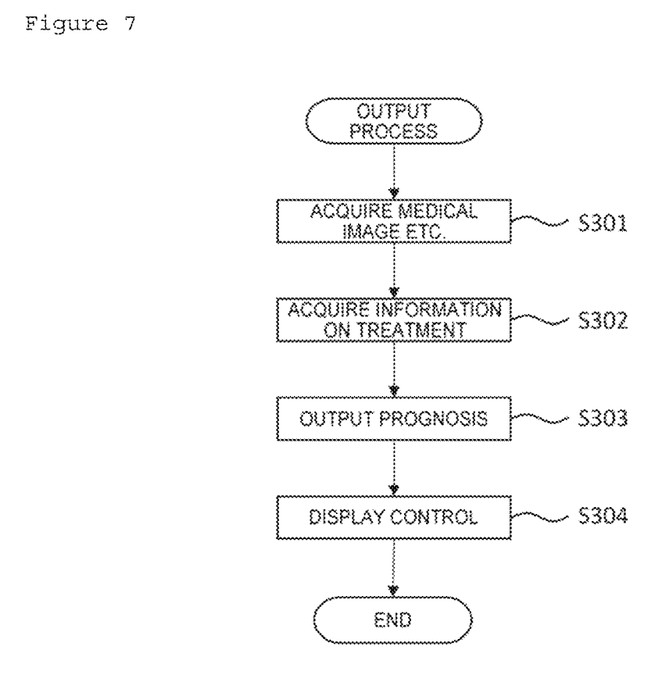
FIG. 7 is an exemplary flowchart illustrating an example of a process of outputting information on a prognosis performed by an output unit.

FIG. 7 is a flowchart illustrating an example of a process in which the output unit 156 of the information processing device 100 causes the discriminator to output information on a prognosis for a case where treatment is performed.

In step S301, the acquisition unit 155 acquires information on a medical image and information on a biological parameter. At this time, the acquisition unit 155 may acquire the information on the medical image and the information on the biological parameter from another information processing device or measurement device via the communication interface 120, or acquire the information on the medical image and the information on the biological parameter from an information input device, such as a keyboard or touch panel, via the input/output interface 130.

In step S302, the acquisition unit 155 may also acquire information on the treatment to be performed. For example, the acquisition unit 155 can acquire the information on the treatment to be performed as a doctor operates an information input device, such as a keyboard or touch panel. If the doctor diagnoses a subject as having a disease "age-related macular degeneration," the doctor can input such information, or can also input his/her finding that "only the central part of the field of vision appears distorted," for example, instead of the disease name. Alternatively, the doctor can also input a specific treatment method such that "anti-VEGF therapy should be performed once in six weeks," for example. The acquisition unit 155 can acquire the information on the treatment to be performed based on such input information.

Alternatively, the acquisition unit 155 may acquire the information on the treatment to be performed, such as a disease name of a subject or his/her symptom, from electronic health record information stored in the storage of the information processing device or a server accessible from the information processing device, instead of the doctor's input operation.

In step S303, the output unit 156 inputs to the discriminator the information on the medical image, the information on the biological parameter, and the information on the treatment to be performed, and causes the discriminator to output information on a prognosis for a case where the treatment is performed. At this time, if the information on the treatment to be performed includes a plurality of treatment methods, the output unit 156 can output information on a prognosis for each treatment method.

The output unit 156 can also output information on a prognosis by adding thereto information on the treatment cost for each treatment method. Accordingly, it is possible to perform a comparison regarding the treatment cost for each treatment method.

In step S304, the display unit 157 displays the output information on the prognosis on an image output device, such as a display, in a controlled manner. The display control method herein is not limited to a particular method, but examples include a graph obtained by plotting the progress of the prognosis such that the ordinate axis indicates the visual acuity and the abscissa axis indicates the time axis, a graph obtained by displaying such a graph for each treatment method in a superposed manner, and a list obtained by arranging visual acuity prognoses or treatment costs in order of increasing or decreasing level.

With the prognosis determination system provided by the information processing device 100 according to the aforementioned embodiment of the present invention, it is possible to determine, based on a medical image, a prognosis for a case where predetermined treatment is performed without depending on specialists with more expertise for a specific disease, such as a macular specialist among ophthalmologists. If there are a plurality of options of treatment methods, a prognosis can be determined for each treatment. Thus, it is possible to present an index for a doctor or subject to select a treatment method.

As described above, the present invention is not limited to the aforementioned embodiments or examples, and can be modified in various ways within the gist of the present invention. That is, the aforementioned embodiments are only exemplary in all aspects, and thus should not be construed narrowly.

For example, the acquisition unit 155 may acquire information on a prognosis after the treatment from electronic health record information, and deliver it to the learning unit 158. Accordingly, the learning unit 158 can add the information on the posttreatment prognosis to the training data to perform additional learning.

The aforementioned prognosis determination system may include a server 200, which is a prognosis determination device, and a user terminal 300 connected in a communicable manner via a communication network, such as the Internet.

Figure 8:
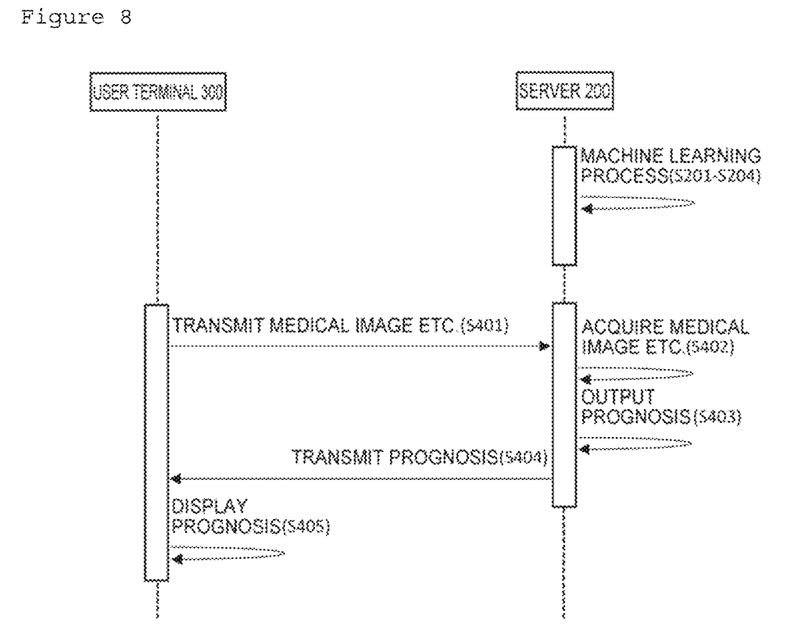
FIG. 8 is an exemplary process sequence of a prognosis determination system including a server, which is a prognosis determination device, and a user terminal.

FIG. 8 illustrates a process sequence of the prognosis determination system including the server 200, which is the prognosis determination device, and the user terminal 300. The server 200 is connected to the user terminal 300 in a communicable manner via a communication network, such as the Internet. The prognosis determination system is provided in which the server 200 inputs, to a discriminator, information on a medical image, information on visual acuity, and information on the treatment to be performed received from the user terminal 300, and outputs information on a prognosis for a case where the treatment is performed, and then transmits the output information to the user terminal 300.

Herein, the server 200 is an example of an information processing device that implements the entirety of or part of the prognosis determination system of the present invention, and can have the hardware configuration or the configurations of the functional units of the aforementioned information processing device 100. The user terminal 300 may be a general computer that can transmit and receive information and has a display capable of displaying information.

In step S401, the user terminal 300 transmits to the server 200 information on a medical image, information on visual acuity, and information on the treatment to be performed. Then, in step S402, the acquisition unit of the server 200 acquires the information on the medical image, the information on the visual acuity, and the information on the treatment to be performed.

In step S403, the output unit of the server 200 inputs to the discriminator the information on the medical image, the information on the visual acuity, and the information on the treatment to be performed received from the user terminal 300, and then outputs information on a prognosis for a case where the treatment is performed.

In step S404, the server 200 transmits to the user terminal 300 the output information on the prognosis. Then, in step S405, the user terminal 300 can display the information on the prognosis on a display device in a controlled manner.

Figure 9:
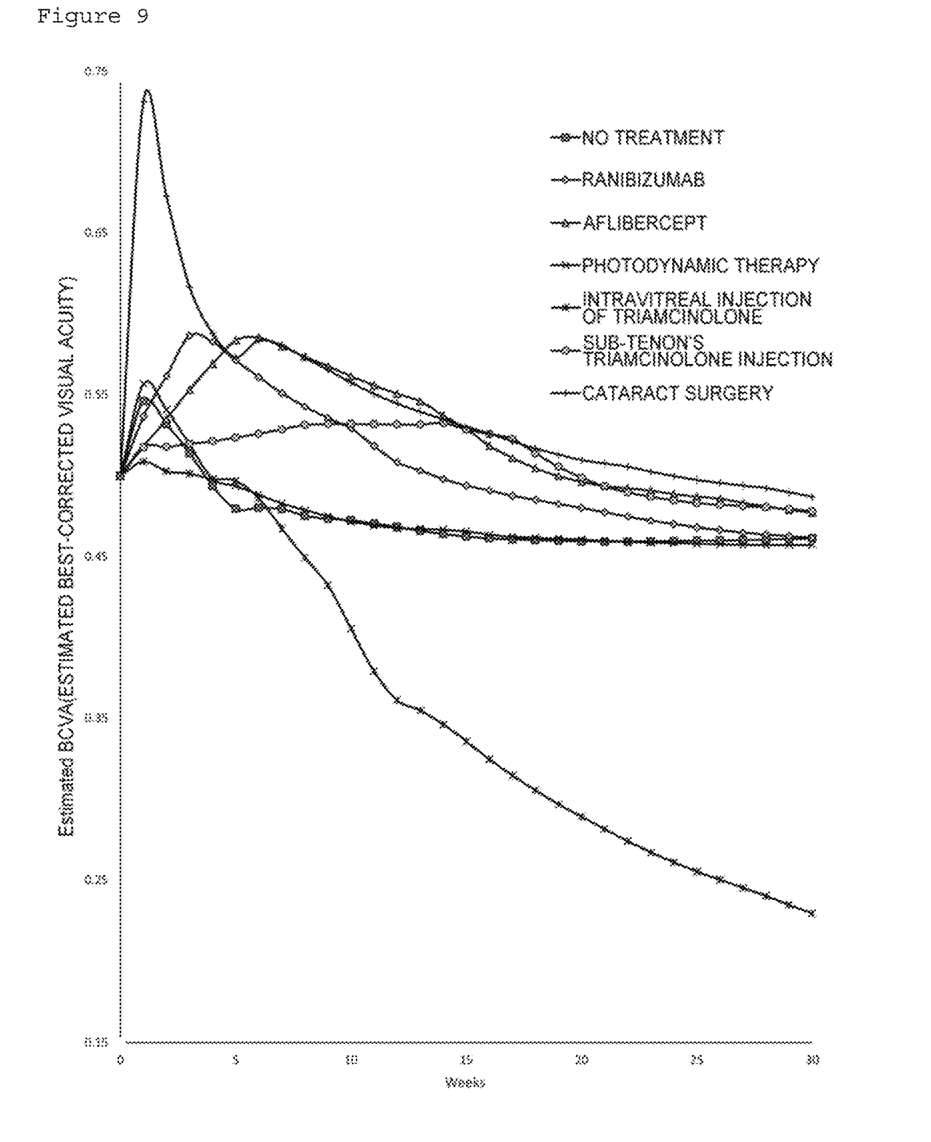
FIG. 9 is an exemplary graph of the progress of a prognosis for each treatment method that is displayed on a display device in a controlled and superposed manner.

FIG. 9 is an exemplary graph of the progress of a prognosis for each treatment method that is displayed on the display device of the user terminal 300 in a controlled and superposed manner. The ordinate axis of the graph indicates the visual acuity, and the abscissa axis indicates the number of weeks. In FIG. 9, the current visual acuity of the subject is 0.5, and the progress of a prognosis when each treatment method is performed is illustrated. From such a graph, it can be found that if the treatment is not performed (no treatment), the visual acuity of the subject will decrease, while if the treatment is performed, the visual acuity is expected to be regained. For example, if aflibercept is injected, it is expected that performing treatment again 10 to 16 weeks later can maintain the visual acuity. Thus, a treatment policy for the next medical examination can be determined.

Accordingly, any user terminal 300 that can access the server 200 can use the prognosis determination system so that regional differences in medical level can be resolved.

REFERENCE SIGNS LIST

1 Prognosis determination system
100 Information processing device
110 Processor
120 Communication interface
130 Input/output interface
140 Memory
150 Storage
151 Operating system
152 Network communication unit
153 Subject data
154 Training data
155 Acquisition unit
156 Output unit
157 Display unit
158 Learning unit
160 Communication bus
200 Server
300 User terminal

The invention claimed is:

1. A prognosis determination device comprising:
a processor and communication interface configured to acquire a medical image and a biological parameter that are related to a disease of a subject from an imaging input device; and
the processor configured to input, to a discriminator, information on the medical image, information on the biological parameter, and information on treatment to be performed on the subject, and cause the discriminator to output information on a prognosis for the subject for a case where the treatment is performed,
wherein:
the discriminator has been generated through a machine learning process based on actual treatment data and interpolation treatment data, wherein the interpolation treatment data represents treatment scenarios beyond available actual treatment records,
the actual treatment data is data on the treatment that has been actually performed, the actual treatment data including a pretreatment medical image as well as a pretreatment biological parameter of a patient, information on the treatment performed on the patient, and information on a prognosis for the patient after the treatment, and
the interpolation treatment data is information for interpolating a posttreatment prognosis for the patient, the interpolation treatment data including information generated from the actual treatment data and a typical model obtained when the treatment is performed, wherein the typical model is constructed from real-world clinical data collected at shorter intervals, published medical literature, and clinical trial data describing treatment methods and outcomes, and wherein the typical model is combined with actual patient data to form the interpolation treatment data.

2. The prognosis determination device according to claim 1, wherein the processor further causes the discriminator to output information on a prognosis for a case where the treatment is not performed.

3. The prognosis determination device according to claim 1, wherein at least one of information on past treatment performed on the subject, age of the subject, or gender of the subject is further input to the discriminator.

4. The prognosis determination device according to claim 1, further comprising a display unit that displays the information on the prognosis for each treatment type, for each treatment cost, or for each prognosis in a controlled manner.

5. The prognosis determination device according to claim 1, wherein the typical model obtained when the treatment is performed includes information on the treatment and information on a prognosis after the treatment, and is created from information not including the pretreatment medical image, and provides a normative trajectory of treatment and prognosis.

6. The prognosis determination device according to claim 1, wherein:
the medical image is an ocular fundus image, and
the prognosis is a visual acuity prognosis.

7. The prognosis determination device according to claim 6, wherein the ocular fundus image is a tomogram in a horizontal direction and a tomogram in a vertical direction.

8. A non-transitory computer-readable storage medium storing a program that, when executed by a processor, causes the processor to execute:
a step of acquiring a medical image and a biological parameter that are related to a disease of a subject from an imaging input device; and
a step of inputting, to a discriminator, information on the medical image, information on the biological parameter, and information on treatment to be performed on the subject, and causing the discriminator to output information on a prognosis for the subject for a case where the treatment is performed,
wherein:
the discriminator has been generated through a machine learning process based on actual treatment data and interpolation treatment data, wherein the interpolation treatment data represents treatment scenarios beyond available actual treatment records,
the actual treatment data is data on actual treatment, the actual treatment data including a pretreatment medical image as well as a pretreatment biological parameter of a patient, information on the treatment performed on the patient, and information on a prognosis for the patient after the treatment, and
the interpolation treatment data is information for interpolating a posttreatment prognosis for the patient, the interpolation treatment data including information generated from the actual treatment data and a typical model obtained when the treatment is performed, wherein the typical model is constructed from real-world clinical data collected at shorter intervals, published medical literature, and clinical trial data describing treatment methods and outcomes, and wherein the typical model is combined with actual patient data to form the interpolation treatment data.

9. A prognosis determination method comprising:
acquiring, using a processor and communication interface, a medical image and a biological parameter that are related to a disease of a subject from an imaging input device; and
inputting, using the processor, to a discriminator, information on the medical image, information on the biological parameter, and information on treatment to be performed on the subject, and causing the discriminator to output information on a prognosis for the subject for a case where the treatment is performed,
wherein:
the discriminator has been generated through a machine learning process based on actual treatment data and interpolation treatment data, wherein the interpolation treatment data represents treatment scenarios beyond available actual treatment records,
the actual treatment data is data on actual treatment, the actual treatment data including a pretreatment medical image as well as a pretreatment biological parameter of a patient, information on the treatment performed on the patient, and information on a prognosis for the patient after the treatment, and
the interpolation treatment data is information for interpolating a posttreatment prognosis for the patient, the interpolation treatment data including information generated from the actual treatment data and a typical model obtained when the treatment is performed, wherein the typical model is constructed from real-world clinical data collected at shorter intervals, published medical literature, and clinical trial data describing treatment methods and outcomes, and wherein the typical model is combined with actual patient data to form the interpolation treatment data.

* * * * *